(12) United States Patent
Reilly (10) Patent No.: US 8,074,207 B1
(45) Date of Patent: Dec. 6, 2011

(54) APPLICATION PROFILING

(75) Inventor: Thomas Reilly, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 1025 days.

(21) Appl. No.: 11/756,519

(22) Filed: May 31, 2007

(51) Int. Cl.
*G06F 9/44* (2006.01)

(52) U.S. Cl. .............. 717/130; 717/131; 717/158

(58) Field of Classification Search .......... 717/158, 717/131, 130
See application file for complete search history.

(56) References Cited

U.S. PATENT DOCUMENTS

| | | | | |
|---|---|---|---|---|
| 5,539,907 | A * | 7/1996 | Srivastava et al. | 717/130 |
| 5,732,273 | A * | 3/1998 | Srivastava et al. | 717/128 |
| 6,002,872 | A * | 12/1999 | Alexander et al. | 717/127 |
| 6,507,805 | B1 * | 1/2003 | Gordon et al. | 702/186 |
| 6,560,722 | B1 * | 5/2003 | Frankel et al. | 714/38.11 |
| 6,691,254 | B2 * | 2/2004 | Kaler et al. | 714/39 |
| 6,751,789 | B1 * | 6/2004 | Berry et al. | 717/130 |
| 7,047,521 | B2 * | 5/2006 | Bunnell | 717/130 |
| 7,290,246 | B2 * | 10/2007 | Cyran et al. | 717/130 |
| 7,496,907 | B2 * | 2/2009 | Hind et al. | 717/158 |
| 2003/0105857 | A1 * | 6/2003 | Kamen et al. | 709/224 |

OTHER PUBLICATIONS

Tia Newhall, "Performance Measurement of Interpreted, Just-in-Time Compiled, and Dynamically Compiled Executions", 1999.*
Malony et al. "Tracing Application Program Execution on the Cray X-MP and Cray 2", 1990, IEEE, pp. 60-73.*
Moore et al., "Profiling Interrupt Handler Performance Through Kernel Instrumentation", 2003.*
Metz et al., "Efficient Instrumentation for Performance Profiling", 2003.*
Valgrind Developers, http://valgrind.org/docs/manual/mc-tech-docs.html, Printed Jun. 2006.
YourKit, LLC, http://www.yourkit.com/features/index.jsp, Printed May 2007.

* cited by examiner

*Primary Examiner* — Wei Zhen
*Assistant Examiner* — Phillip Nguyen
(74) *Attorney, Agent, or Firm* — Fish & Richardson P.C.

(57) ABSTRACT

Methods, systems and apparatus, including computer program products, for profiling an application. An application for execution is obtained. The application comprises a plurality of machine-independent first instructions. Regions of the first instructions that implement one or more programming language methods, functions, or flow control structures are identified. The first instructions are translated into corresponding machine-dependent second instructions for a target machine. The second instructions are instrumented to include sampling instructions for the identified regions. The sampling instructions are configured to cause generation of a state sample when an identified region is executed. Each state sample includes a time stamp and an identification of a currently executing method or function. The second instructions are executed in order to execute the application. During the execution of the application, each generated state sample is collected.

24 Claims, 4 Drawing Sheets

APPLICATION PROFILING

BACKGROUND

The present disclosure relates to profiling an application.

Application profilers track and capture information about the execution of an application. Typically an application has to be specially compiled so that when the application is subsequently executed profiler information will be captured. Some application profilers operate in two steps, first capturing and storing profile data in an encoded file while an application is running. In a second step, subsequent to the application's execution, the encoded file can be decoded to derive human-readable profiler information. Thus, analysis of the profiler data occurs separately from the execution of the application. Alternatively, some profilers provide profiler data to another running process which decodes the profiler information as the application being profiled runs. However, the profiler data is limited to a subset of the information available in the application's running process.

SUMMARY

This specification describes technologies relating to profiling an application.

In general, one aspect of the subject matter described in this specification can be embodied in methods that include the actions of obtaining an application for execution. The application comprises a plurality of machine-independent first instructions. Regions of the first instructions that implement one or more programming language methods, functions, or flow control structures are identified. The first instructions are translated into corresponding machine-dependent second instructions for a target machine. The second instructions are instrumented to include sampling instructions for the identified regions. The sampling instructions are configured to cause generation of a state sample when an identified region is executed. Each state sample includes a time stamp and an identification of a currently executing method or function. The second instructions are executed in order to execute the application. During the executing each generated state sample is collected. Other embodiments of this aspect include corresponding systems, apparatus, and computer program products.

These and other embodiments can optionally include one or more of the following features. Information based on the collected samples can be presented on a display device during execution of the application. The presenting can include presenting information regarding the execution time spent in each method or function. The presenting can include presenting information regarding memory allocation. Instrumenting can include inserting the sampling instructions into the second instructions at method or function entry points or backwards branches. Collecting each generated state samples can include determining if a time period has elapsed. A state sample is collected if the time period has elapsed. Collecting each state sample can include capturing a snapshot of a current execution stack and adding the snapshot to the set of samples. While the application is executing, an indication that an object is being instantiated can be added to the collected samples when the object is instantiated. While the application is executing, an indication that an object is being destroyed can be added to the collected samples when the object is destroyed. The collected samples can be ordered according to each sample's respective time stamp.

Particular embodiments of the subject matter described in this specification can be implemented to realize one or more of the following advantages. Profiling data of an application is collected while the application is running. Profiling data is collected, processed and presented within the same process or threads as the running application being profiled. Profiling data can be stored and later accessed in off-line analysis. No synchronization or inter-process data marshalling is necessary. Profiling information is collected and presented interactively and on demand based on the needs of the profiler user.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
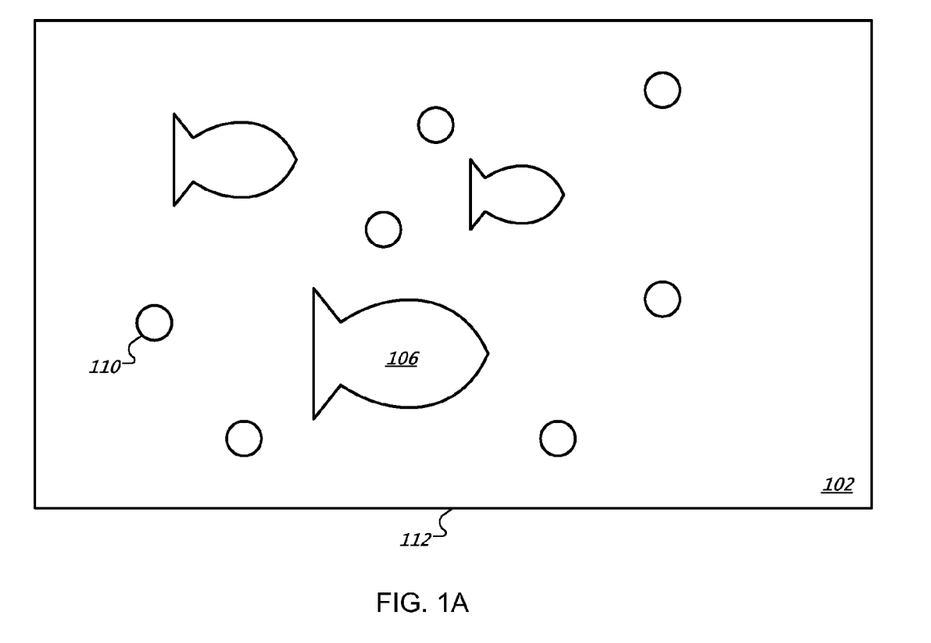
FIG. 1A is a screenshot of a presentation generated by an executing application.

FIG. 1A is a screenshot of a presentation 102 generated by an executing application. The executing application is an example of an application from which state samples can be collected. Although the specific operations carried out by any particular application vary from application to application, the operations of an application are specified by the application's particular sequence of instructions. For example, the instructions of the executing application generate the presentation 102, which includes animated bubbles 110 and fish 106. The instructions that are executed cause the position of fish and bubbles to change position within a display area 112. As the application executes, the application also allocates and deallocates resources (e.g., memory) to store values. For example, the application may allocate memory used for storing properties of each of the fish 106, such as appearance, position and direction. State samples, which generally describe the execution of the application, are collected as operations of the application are carried out over the course of the application's execution. State samples can include information about the execution of the application, such as what part the application was executed at a particular point in time, for example. State samples can also include information about resource consumption (e.g., such as memory allocations or deallocations), which occur over the course of the application's execution.

Figure 1B:
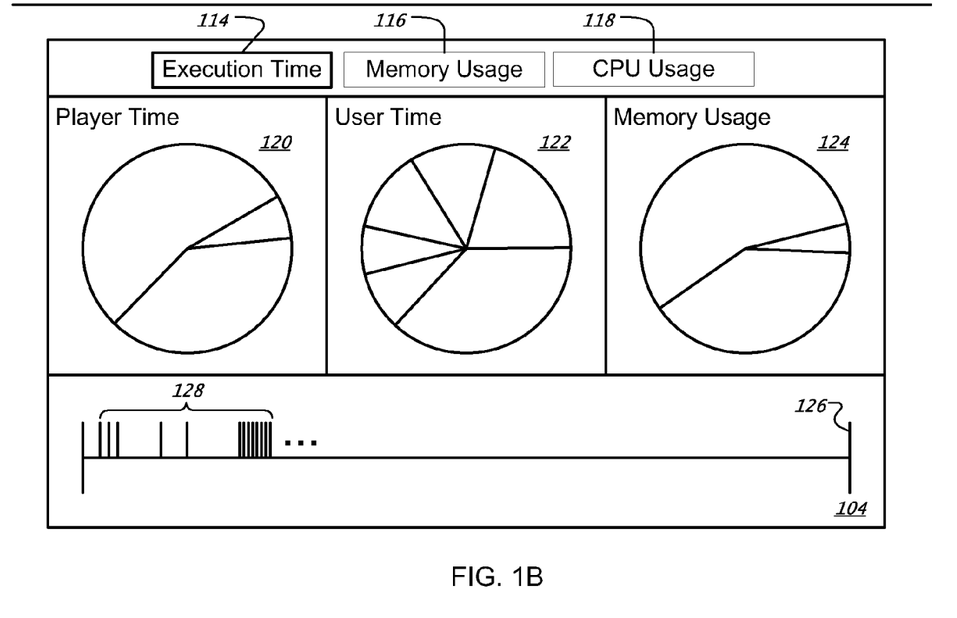
FIG. 1B is a screenshot of a presentation of profile information pertaining to the executing application.

FIG. 1B is a screenshot of a presentation of profile information 104 pertaining to the executing application. State samples collected from the executing application are used to derive a human-readable presentation of profile information 104. The collection of state samples, the derivation of profile information, and the presentation of profile information 104 occurs during execution of the application. In other words, the collection of state samples and the display of profile information occurs in the same process or thread, for example, in which the application being profiled is executing. In general, the execution of the application, collection of the state samples and derivation of profile information from the state samples can be managed by an application execution environment, discussed below.

To collect state samples concerning the execution of the application, instructions of the application are instrumented before the application is executed. Instrumenting adds sampling instructions that cause state samples to be collected as the application is executing. State samples and sampling instructions are described in more detail in reference to FIG. 2.

The presentation of profile information 104 includes information derived from state samples collected while the application is running. The profile information that is displayed can vary among implementations but generally includes information relating to the execution time of the application and memory events. For example, the profile information can be used to compare the amount of execution time used to animate the fish in presentation 102 of FIG. 1 compared to the execution time used to animate the bubbles. Likewise, allocating new memory, used by the executing application for representing a new fish in the presentation 102, can be presented a memory event in the profile information 104 (e.g., so that a user can observe the relative frequency of memory allocations (or deallocations) over time as the application executes).

In some implementations, the presentation of profile information 104 is interactive thereby allowing a user to control the collection of state samples on demand while the application is executing. In some implementations, for example, users are able to start and stop some or all of state sample collection (e.g., cause only particular state samples to be collected for only particular parts of the application). The presentation of profile information 104 can also allow the user to control what profile information is presented. As shown, the presentation of profile information 104 can include buttons which can be selected to display information relating to application execution time 114, memory usage 116, or CPU (central processing unit) statistics 118.

In various implementations, the profile information display 104 presents information concerning the amount of time used to execute the application. For example, the relative amount of processing time used to execute logical components of the application can be presented in a pie chart 120. The pie chart 120 can be used to compare each component (e.g., instructions of the application, external libraries, system calls or memory management). For example, one portion corresponds to the proportion of execution time used by system libraries such as those used to draw visual elements (e.g., fish 106, bubbles 110) to the display area 112. Another portion shows the proportion of execution time used to execute instructions of the application (rather than instructions of supporting libraries). Another portion corresponds to the proportion of execution time used managing memory (e.g., garbage collection or other memory management activities).

In various implementations, the relative amount of execution time used to execute various portions of the application's instructions is also presented in a chart 122. In some implementations each portion may correspond to the relative amount of time used to execute a method, subroutine, function, procedure, code block (or combination thereof) of the application. For example, a first portion corresponds to a method concerning the repositioning of fish in the display area 112, while another portion corresponds to another method concerning the rendering of bubbles 110 in the display area 112.

In further implementations, memory usage information is presented as the chart 124, illustrating the relative amount of memory used by components of the application. For example, one portion illustrates the proportion of memory used by the application, while another portion illustrates the proportion of unused memory. A timeline 126 can be used to plot the execution events 128, such as memory allocations or method entries, over a particular period of time for which the application is executing.

Figure 2:
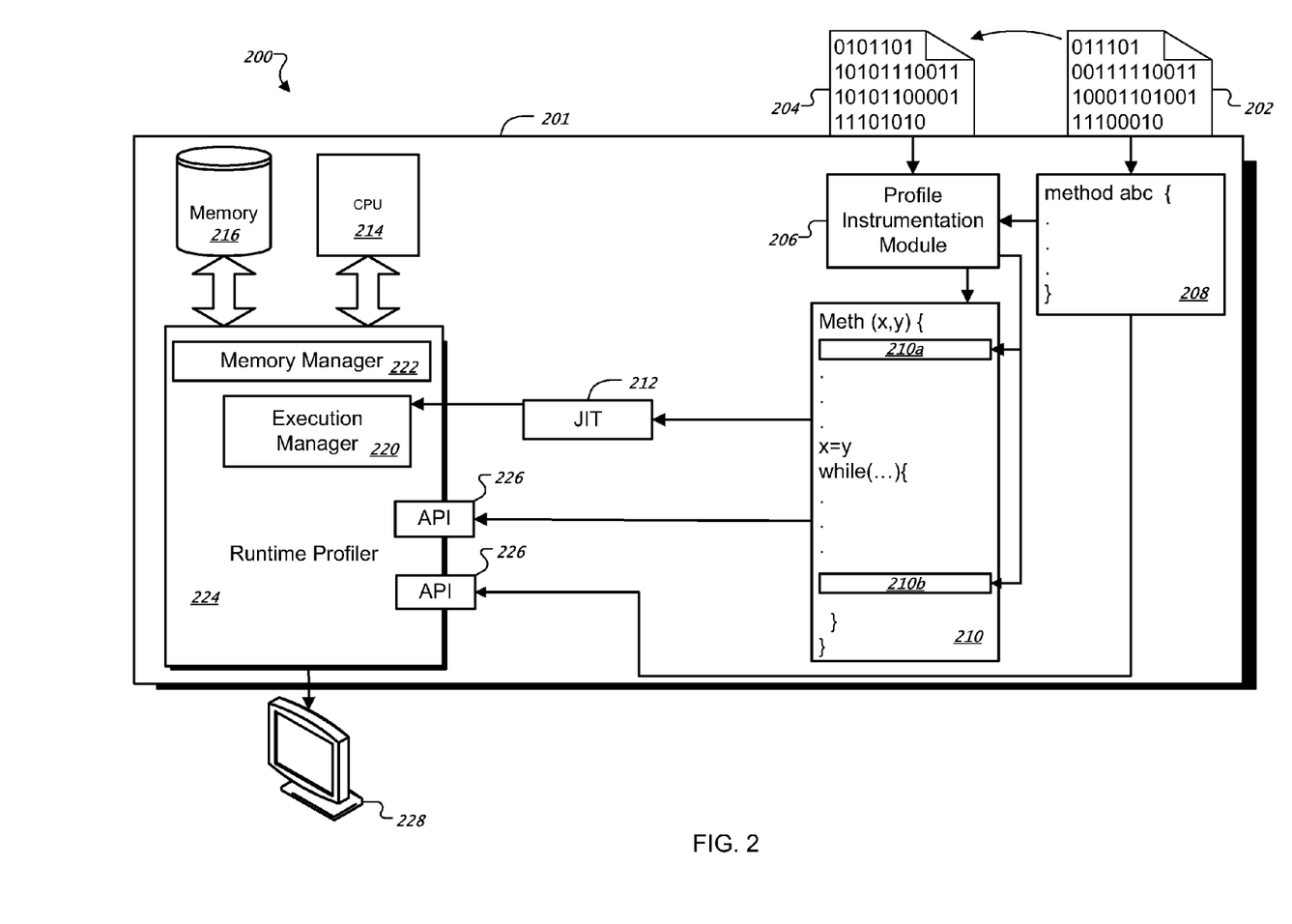
FIG. 2 is a block diagram showing a system for capturing state samples.

FIG. 2 is a block diagram of a system 200 for capturing state samples. The system 200 includes a profiling agent 202. The agent 202 generally includes instructions 208 that provide a user interface for presenting and interacting with profiler information as well as controlling the collection of state samples. The agent 202 and the application 204 can be represented as series of encoded instructions. Generally, the encoded instructions are platform independent instructions (e.g., bytecode, such as Adobe Flash® ActionScript bytecode, or source code), that are decoded, such as through interpretation or translation, and executed by an application execution environment 201. In various implementations, the application execution environment 201 is a virtualization environment that works in conjunction with native services (e.g., an operating system) of a data processing apparatus to provide a consistent well-defined environment in which applications can be loaded and executed. The application execution environment typically includes facilities such as memory management (e.g., garbage collection), standard libraries, media decoders, user interface frameworks and input-output interfaces (e.g., display device 228). An application designed to run within an application execution environment can often be developed rapidly because developers can rely on the consistency of the application execution environment—even if the environment itself exists on widely varying platforms. The application execution environment can be a plug-in to a web browser or a standalone software program. One such application execution environment is the Adobe Flash Player available from Adobe Systems Incorporated of San Jose, Calif. Each application executed by the application execution environment can correspond to a Macromedia Flash (SWF) file, an ActionScript (AS) file or a Flash Video (FLV) file, for example. Another such application execution environment is the Java Virtual Machine available from Sun Microsystems Inc of Santa Clara, Calif.

In some implementations, the profiling agent 202 requests that the application execution environment 201 both load and instrument the application 204. For example, the profiling agent 202 can be invoked with user input specifying the application 204 as the application to be profiled. In some implementations, the profiling agent 202 includes the application 204 (e.g., in a single file). In another example, the profiling agent 202 can reference configuration information (e.g., a configuration file) that specifies the application 204 to be instrumented. For example, the application 204 can be specified using a application name, a file name or URL (universal resource locator) that identifies a file containing an encoded representation of the application 204. In some implementations, the profiling agent 202 is, to the application execution environment 201, like any other application and is loaded before the application 204. In other implementations, the profiling agent 202 is a part of the application execution environment 201 rather than a separate application.

The agent 202 requests (e.g., by way of application program interface (API) or other mechanism) that the application execution environment instrument the instructions of application 204 so that application 204 can be profiled (e.g., profile data collected). In response to the request, a profile instrumentation module 206 identifies regions of the instructions of the application 204 to which to add sampling instructions. For example, the regions 210*a* and 210*b* illustrate where sampling instructions can be inserted into the method 210.

Sampling instructions are instructions that, when executed, collect application state samples that capture a snapshot of application's execution state at the time of collection. The snapshot identifies the method executing at the time the state sample was collected. Other state information about the execution of the method can also be identified from the snapshot. For example, other state information can include the method's call stack, local variables, global variables, member variables, instantiated objects. In some implementations, the state samples that capture snapshots can be used to access the state of the entire call stack of the executing method (e.g., the variables of any method in the call stack). Method information that is not based on execution state can also be derived from a state sample (e.g., the file in which the executing method is defined or the line number of the most-recently executed instruction).

Collection of state samples occur as the application, including sampling instructions, execute. For example, state samples are collected synchronously with respect to an execution thread or process of the application—although collection can still occur within an execution thread of the application that is asynchronous with respect to other execution threads of the application. State samples are collected from each thread of a multi-threaded application as sampling instructions are executed in each thread.

The sampling instructions can be inserted into the instructions of the applications based on features of the instructions such as method entries, at method exits, and flow control structures. For example, a sampling instruction can be inserted at the beginning of an if, if-else, switch statement, or inside any loop (e.g., a for, while, foreach, or until loop), as illustrated by regions 210*a* and 210*b*. In some implementations, sampling instructions are inserted at any point where execution moves to an instruction in the sequence of instructions that has already been passed (e.g., a backward jump).

In various implementations, the encoded instructions of the method 210 are instrumented before the instructions are translated into platform dependent instructions (e.g., machine code specific to a microprocessor) or interpreted by the application execution environment. In some implementations, the instrumented instructions can be translated into platform dependent instructions by a just-in-time (JIT) compiler 212, which is used to translate the encoded instructions into platform dependent instructions for execution. In other implementations however, the encoded instructions are instrumented after or during translation of an application's encoded representation. In general, any representation corresponding to the instructions of the application can be instrumented.

An execution manager 220 coordinates execution of an application's instructions on the CPU 214. For example, the execution manager 220 can provide instrumented instructions, translated by the JIT compiler 212, to the CPU 214. The execution manager 220 can also communicate with the runtime profiler 224.

In some implementations, a state sample is collected only if a runtime profiling state flag is set to true. Conversely, if the profiling state flag is set to false, then state samples are not collected and profiling is effectively disabled. The profiling state flag can be manipulated (e.g., turned on or turned off) during the execution of the application. For example, the profiling flag can be toggled by the agent 202 or application 204 by way of an application execution environment API for toggling the profiling flag. In other implementations, the profiling flag can be set automatically based on pre-determined criteria.

The system 200 includes memory 216, which is used by the application to store information. For example, values used by the application 204 are stored in memory, and call frames corresponding to execution flow of the application are stored in a call stack. In addition, an executing application can request that portions of memory (e.g., heap memory) be allocated for the application to use (e.g., as an instantiation of a class as an object). In some implementations, an application can also request that portions of memory be deallocated (e.g., a deletion of an instantiated object). Such requests are typically received and managed by a memory manager 222. In general, the memory manager 222 carries out memory management operations for applications being executed in the application execution environment. These operations can include responding to allocation or deallocation requests by an application or reclaiming unused memory (e.g., garbage collection).

In some implementations, each collected state sample is either a snapshot of the execution or indicates the occurrence of a memory event (e.g., a memory allocation or deallocation). State samples indicating the occurrence of a memory event can be collected by the memory manager 222. As the memory manager responds to memory allocation and deallocation requests by the currently executing application, the memory manager collects state samples indicating memory events. In some implementations, where state sample collection is governed by a profiling state flag, the memory manager checks the flag to determine whether to collect samples. In some implementations, a request to profile an application (e.g., by the agent 202) causes all memory related requests to be redirected to a profiling memory manager that collects state samples indicating that memory events have occurred.

The runtime profiler 224 provides a mechanism accessing state samples. For example, the runtime profiler 224 can be used to access state samples corresponding to snapshots or memory events. In some implementations, the runtime profiler 224 also provides profile information derived from the state samples such as CPU utilization, memory utilization, and the like. The runtime profiler 224 includes an API 226 that both the application 204 and the agent 202 can use. The API 226 is used by the application or the agent, respectively, to access state samples. For example, the agent 202 uses the collected state samples to generate the profile information display 104. In some implementations, the API 226 can be used to retrieve values from memory (e.g., corresponding to locally or globally defined variables). Such retrieval can be facilitated by the memory manager 222. For example, in addition to the agent 202 presenting information about the variables defined in a method that is currently executing, the agent 202 can also present the current value of a variable. To do so, the agent 202 requests retrieval of the value of the memory identified by the variable of interest. The value retrieved is only current at retrieval time as the value of the variable may subsequently change as the application is executing.

In some implementations, state samples are stored completely in memory. Compared to some conventional approaches, this reduces or eliminates profiler information encoding and decoding, inter-process communication, and cross-application synchronization. Additionally, the state samples can reference information about the application and environment (e.g., application execution environment) such as local variables, member variables, invocation stacks, global variables, and memory allocations. Using such references the API 226 can be used to query for further information about the running application (e.g., to retrieve memory values). The state samples are collected in the same execution environment in which the instrumented application is being executed.

Figure 3:
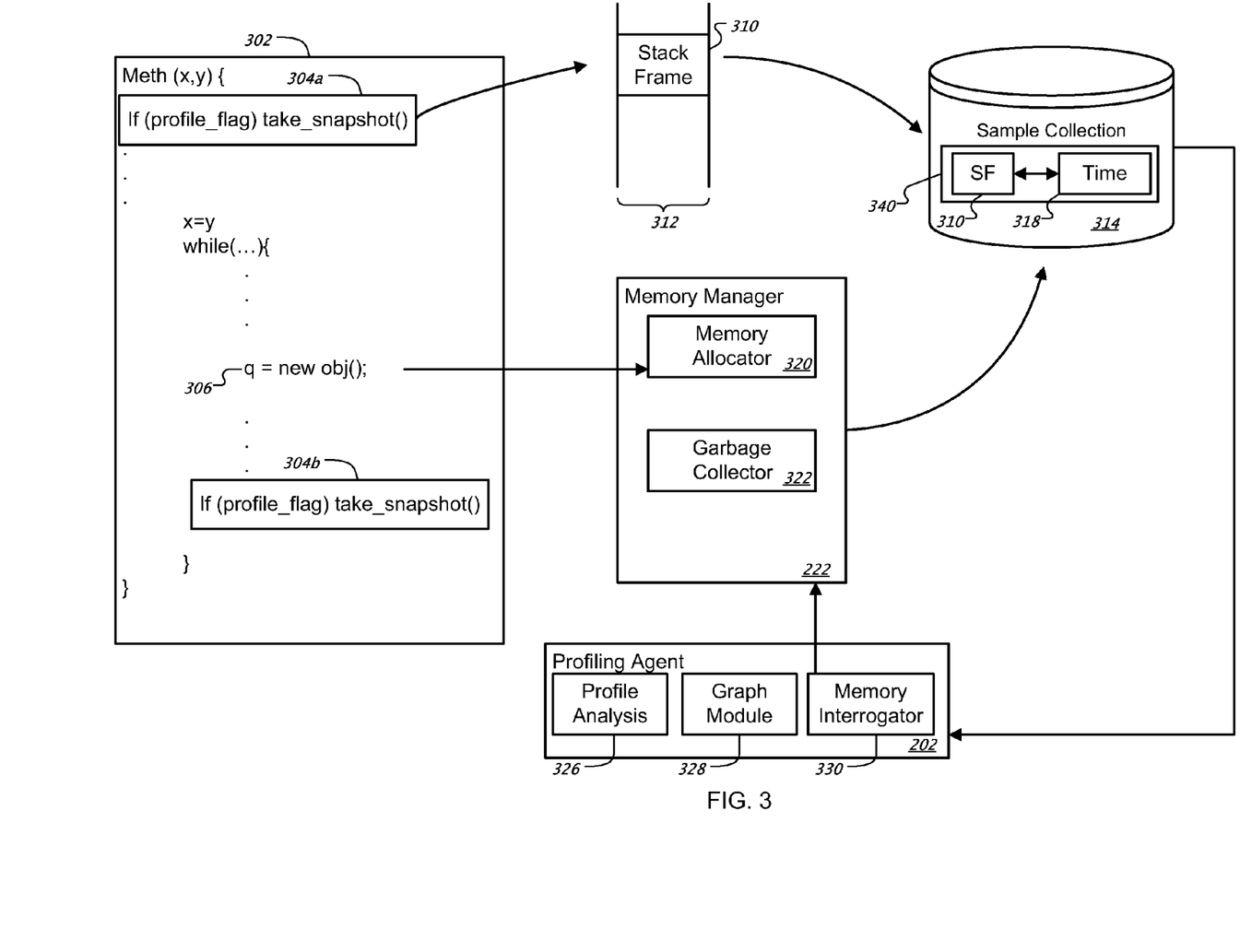
FIG. 3 is a block diagram showing the generation of state samples.

FIG. 3 is a block diagram showing the generation of state samples. An instrumented method 302 is described as an illustrative example. The instrumented method 302 includes regions of interest 304a and 304b, that have been instrumented to include sampling instructions. As shown, each region includes statements that check a profile flag and conditionally collect a state sample capturing a snapshot of the application's execution (e.g., the sample is collected by calling take_snapshot method).

During the execution of region 304a, if the profile flag is set to true, a state sample is collected. In some implementations, a state sample is collected if both the flag is set to true, and a sufficiently minimum interval of time has elapsed since the last collection. For example, the take_snapshot method can check an elapsed time, and if the elapsed time does not exceed a specified value, the step of capturing a state sample can be skipped, even if the profile_flag is set to true. In some implementations, the specified value can be adjusted by the application execution environment, the agent or the application being profiled.

A state sample capturing a snapshot of application execution includes the stack frame 310 of the currently executing method, or, in other implementations, a stack frame corresponding to the particular method being executed. In some implementations, the stack frame 310 is copied from a stack 312 and recorded as a state sample 340. For example, invoking the take_snapshot method causes the topmost stack frame 310 on the stack 312, which corresponds to the stack frame of the method 302 being executed, to be recorded in a collection of state samples 314.

The stack frame 310 generally includes run-time information corresponding to the executed method. For example, the stack frame identifies information about method's name, the method's return address, received parameters, local variables, dynamically sized stack variables or other run-time information stored in the stack frame 310. This information is contained or can be derived from the captured snapshot. In some implementations, a snapshot includes one or more pointers to the aforementioned information. In addition to the stack frame, each state sample 340 includes a timestamp 318. In some implementations, the stack frame of any method is a method information object that includes a reference to information about the method (e.g., call stack, method name, parameters or variables). In such implementations, the method information object is copied to the collection of state samples as a snapshot state sample.

State samples are collected in a state sample collection 314, which can be recorded entirely in a temporary memory structure. In other words, it is not necessary to store the state sample collection in non-volatile memory (e.g., a file stored on a hard disk). From the state samples and their respective timestamps, profile information can be derived, such as what method is being executed, how often a method has executed and for how long a method executes.

In some implementations, state samples about memory management events are collected during profiling. These state samples generally include information about when memory allocations have been requested by the application and when memory deallocations have occurred (e.g., explicit deallocations requested by the application, garbage collection, or deallocations implied by memory management schemes such as reference counting). For example, the program statement 306 illustrates an instantiation of a new object, which requires a memory allocation. During the instantiation, a memory allocator 320 allocates the necessary memory. If the requesting application is being profiled a state sample identifying the occurrence of the memory event can be recorded to the sample collection 314. Other memory events, such as when unused memory is reclaimed (e.g., by the garbage collector 322) can also be recorded as sample within the sample collection 314.

As illustrated by FIG. 3 the state sample collection 314 is accessed by the profiling agent 202. In general, the profiling agent uses the collected state samples to derive profiling information that can be presented to a user. The profiling agent 202 includes a profile analysis module 326, a graph module 328 and a memory interrogator module 330.

As illustrated by FIG. 3 the state sample collection 314 is accessed by the profiling agent 202. In general, the profiling agent uses the collected state samples derive profiling information that can be presented to a user. The profiling agent 202 includes a profile analysis module 326, a graph module 328 and a memory interrogator module 330.

The profile analysis module 326 can determine run-time information for the executing application from state samples. Run-time information includes information about the amount of execution used by the application, the application execution environment or an operating system on which the application execution environment is running Run-time information can also include information about CPU utilization, the relative amount of execution or wait time used by various hardware and software components of the application, application execution environment or operating system. For example, the profile analysis module 326 can use the state samples in the state sample collection 314 to derive information related to the execution of an application.

In addition to the information illustrated in FIG. 1, profiling information can include call stack information (e.g., a list of stack frames located in the state sample collection 314), memory event information, or other information. Call stack information can be derived from state samples and are used to describe a path of execution through methods of an application. Memory event information can include a list of objects in memory, the number of currently allocated objects, and the number of object allocations and deallocations. In some implementations, when memory information is presented, variable types can be organized into groups. For example, similar types (e.g., integers, strings, and classes) can be grouped together into sets. The size of the types can also be presented.

The graph module 328 can generate graphs using state samples and information derived by the profile analysis module 326. For example, the graph module 328 can create one or more pie charts, timelines, or other graphical representations derived from the state samples, such as the graphical representations illustrated in FIG. 1.

The memory interrogator module 330 can access memory locations and can display their values. For example, the memory interrogator module 330 can access the value of a variable of a running application. The value, at the time of access, can be displayed as a part of the profiling information. For example, the memory interrogator module 330 can display the value of variables x, y, or the object q in method 302.

Figure 4:
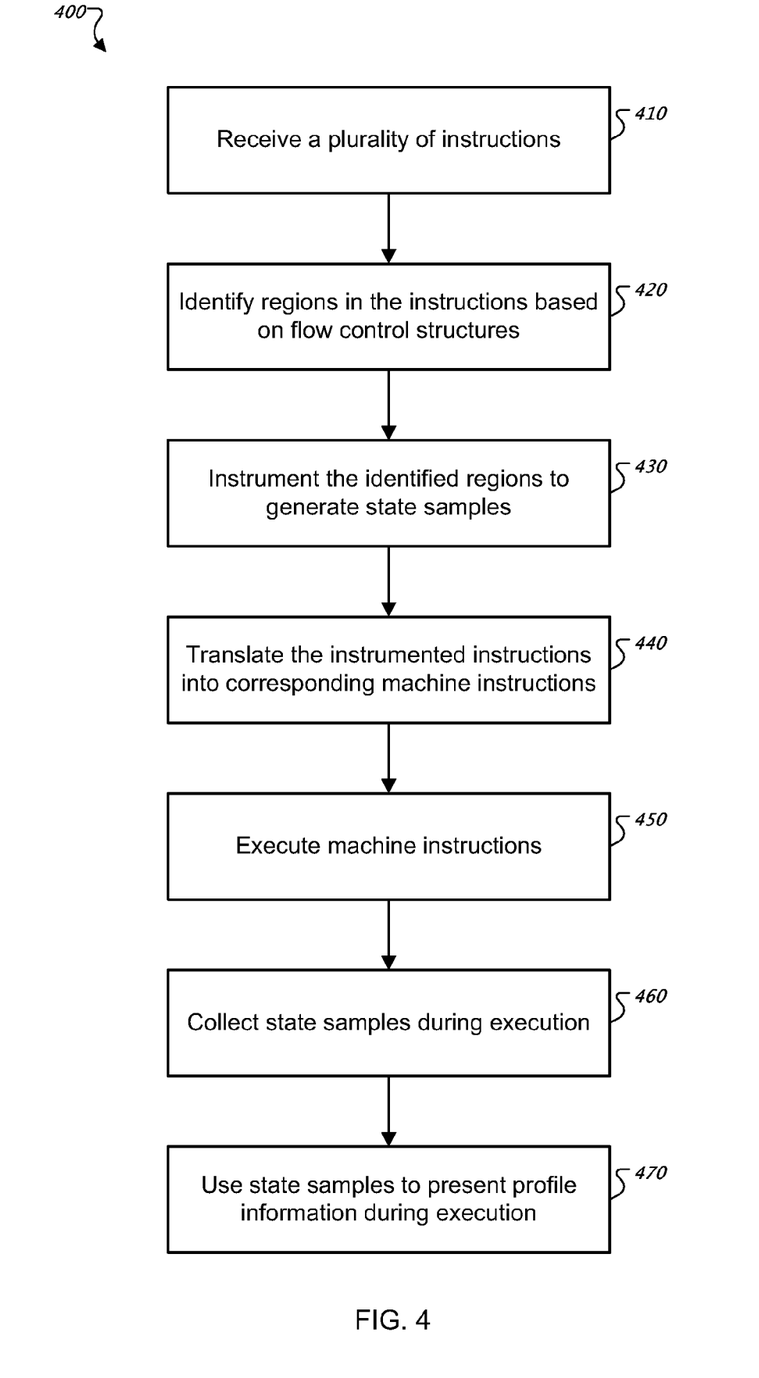
FIG. 4 is a flowchart of a process for generating and presenting profile information based on collected state samples.

FIG. 4 is a flowchart showing a process 400 for generating and presenting profiling information based on collected state samples. Note that some or all of the steps in process 400 are executed in the application execution environment managing the execution of the application being executed. A plurality of instructions, generally corresponding to the application to be profiled, is received (step 410).

Regions in the received instructions are identified based on flow control structures (step 420). The profile instrumentation module 206 can also identify regions of the instructions based on flow control structures specified by the instructions.

Each of the identified regions is instrumented with sampling instructions (step 430) such that when the instructions are executed, state samples can be collected. For example, sampling instructions are added to the identified regions. The added instructions can check a profile state flag and cause a state sample to be collected.

The instrumented instructions are translated into corresponding instrumented machine instructions (step 440). For example, the instrumented instructions are translated by a JIT compiler 212 into machine dependent instructions.

The translated instrumented machine instructions are executed (step 450). For example, the CPU 214 can execute the instrument instructions. As the sampling instructions of the instrumented regions are executed state samples are collected (step 460). For example, the collected state samples are recorded in the state sample collection 314.

The state samples are used to present profile information during the execution of the application (step 470). For example, the profiling agent 202 can access information contained in the state sample collection 314. In addition, the profiling agent can also present profile information using the profile analysis module 326, the graph module 328, the memory interrogator module 330, or some combination thereof. In some implementations, step 420, step 430, or both can occur after step 440. For example, the JIT compiler 212 can first translate the instructions into machine dependent instructions, and then the regions of interest can be identified and instrumented.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, a composition of matter or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining an application for execution, the application comprising a plurality of machine-independent first instructions;
identifying regions of the first instructions that implement one or more programming language methods, functions, or flow control structures;
translating the first instructions into corresponding machine-dependent second instructions for a target machine;
instrumenting the second instructions to include sampling instructions for the identified regions, the sampling instructions configured to cause generation of a state sample when an identified region is executed, each state sample including a time stamp and an identification of a currently executing method or function;
executing the second instructions in order to execute the application, the second instructions executed in a process or thread; and
during the executing, executing application profiling instructions for (i) collecting and (ii) processing each generated state sample, and for (iii) presenting, in real time with the execution, application profile information based on the collected and processed samples on a display device, wherein the collection, processing and presentation of the profile information are performed in the process or thread in which the second instructions are executed.

2. The method of claim 1, where presenting includes:
presenting information regarding the execution time spent in each method or function.

3. The method of claim 1, where presenting includes:
presenting information regarding memory allocation.

4. The method of claim 1, where instrumenting includes:
inserting the sampling instructions into the second instructions at method or function entry points or backwards branches.

5. The method of claim 1, where collecting each generated state sample includes:
determining if a time period has elapsed; and
if the time period has elapsed, collecting a state sample.

6. The method of claim 1, where collecting each state sample includes:
capturing a snapshot of a current execution stack and adding the snapshot to the set of samples.

7. The method of claim 1, further comprising:
adding, while the application is executing, an indication that an object is being instantiated to the collected samples when the object is instantiated; and
adding, while the application is executing, an indication that an object is being destroyed to the collected samples when the object is destroyed.

8. The method of claim 1, further comprising:
ordering the collected samples according to each sample's respective time stamp.

9. A computer program product, encoded on a computer-readable medium, operable to cause data processing apparatus to perform operations comprising:
obtaining an application for execution, the application comprising a plurality of machine-independent first instructions;
identifying regions of the first instructions that implement one or more programming language methods, functions, or flow control structures;
translating the first instructions into corresponding machine-dependent second instructions for a target machine;
instrumenting the second instructions to include sampling instructions for the identified regions, the sampling instructions configured to cause generation of a state sample when an identified region is executed, each state sample including a time stamp and an identification of a currently executing method or function;
executing the second instructions in order to execute the application, the second instructions executed in a process or thread; and
during the executing, executing application profiling instructions for (i) collecting and (ii) processing each generated state sample, and for (iii) presenting, in real time with the execution, application profile information based on the collected and processed samples on a display device, wherein the collection, processing and presentation of the profile information are performed in the process or thread in which the second instructions are executed.

10. The program product of claim 9, where presenting includes:
presenting information regarding the execution time spent in each method or function.

11. The program product of claim 9, where presenting includes:
presenting information regarding memory allocation.

12. The program product of claim 9, where instrumenting includes:
inserting the sampling instructions into the second instructions at method or function entry points or backwards branches.

13. The program product of claim 9, where collecting each generated state sample includes:
determining if a time period has elapsed; and
if the time period has elapsed, collecting a state sample.

14. The program product of claim 9, where collecting each state sample includes:
capturing a snapshot of a current execution stack and adding the snapshot to the set of samples.

15. The program product of claim 9, further operable to cause data processing apparatus to perform operations comprising:
adding, while the application is executing, an indication that an object is being instantiated to the collected samples when the object is instantiated; and
adding, while the application is executing, an indication that an object is being destroyed to the collected samples when the object is destroyed.

16. The program product of claim 9, further operable to cause data processing apparatus to perform operations comprising:
ordering the collected samples according to each sample's respective time stamp.

17. A system comprising:
means for obtaining an application for execution, the application comprising a plurality of machine-independent first instructions;
means for identifying regions of the first instructions that implement one or more programming language methods, functions, or flow control structures;
means for translating the first instructions into corresponding machine-dependent second instructions for a target machine;
means for instrumenting the second instructions to include sampling instructions for the identified regions, the sampling instructions configured to cause generation of a state sample when an identified region is executed, each state sample including a time stamp and an identification of a currently executing method or function;
means for executing the second instructions in order to execute the application, the second instructions executed in a process or thread; and
means for, during the executing, executing application profiling instructions for (i) collecting and (ii) processing each generated state sample, and for (iii) presenting, in real time with the execution, application profile information based on the collected and processed samples on a display device, wherein the collection, processing and presentation of the profile information are performed in the process or thread in which the second instructions are executed.

18. The system of claim 17, where presenting includes:
presenting information regarding the execution time spent in each method or function.

19. The system of claim 17, where presenting includes:
presenting information regarding memory allocation.

20. The system of claim 17, where instrumenting includes:
inserting the sampling instructions into the second instructions at method or function entry points or backwards branches.

21. The system of claim 17, where collecting each generated state sample includes:
determining if a time period has elapsed; and
if the time period has elapsed, collecting a state sample.

22. The system of claim 17, where collecting each state sample includes:
capturing a snapshot of a current execution stack and adding the snapshot to the set of samples.

23. The system of claim 17, further comprising:
means for adding, while the application is executing, an indication that an object is being instantiated to the collected samples when the object is instantiated; and
means for adding, while the application is executing, an indication that an object is being destroyed to the collected samples when the object is destroyed.

24. The system of claim 17, further comprising:
means for ordering the collected samples according to each sample's respective time stamp.

* * * * *